United States Patent
Roos et al.

(10) Patent No.: US 8,899,027 B2
(45) Date of Patent: Dec. 2, 2014

(54) HYBRID ELECTRIC VEHICLE PARTICULATE REGENERATION METHOD AND SYSTEM

(71) Applicant: GM Global Technology Operations LLC, Detroit, MI (US)

(72) Inventors: Bryan N. Roos, West Bloomfield, MI (US); Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 13/735,576

(22) Filed: Jan. 7, 2013

(65) Prior Publication Data

US 2014/0190147 A1    Jul. 10, 2014

(51) Int. Cl.
 *F01N 3/027* (2006.01)
 *F01N 3/023* (2006.01)

(52) U.S. Cl.
 CPC .......... *F01N 3/0238* (2013.01); *Y10S 903/902* (2013.01)
 USPC ................... 60/303; 60/274; 60/285; 60/286; 60/289; 60/295; 60/297; 60/300; 60/311; 60/320; 180/62.275; 180/62.285; 903/902

(58) Field of Classification Search
 USPC .......... 60/274, 277, 285, 286, 289, 295, 297, 60/300, 303, 311, 320; 180/65.265, 180/65.275, 65.28, 65.285; 903/902
 See application file for complete search history.

(56) References Cited

U.S. PATENT DOCUMENTS

| | | | |
|---|---|---|---|
| 7,524,360 B2 | 4/2009 | Cheng | |
| 2009/0025371 A1* | 1/2009 | Hermansson et al. | 60/286 |
| 2011/0283675 A1* | 11/2011 | Gonze et al. | 60/274 |
| 2013/0047607 A1* | 2/2013 | Petrovic et al. | 60/605.2 |

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

A method is applied to regenerate particulate matter in a particulate filter of a hybrid electric vehicle having a combination of a combustion engine and an electric motor for propelling the vehicle, the hybrid electric vehicle having an electrically heated catalyst disposed in flow communication with the particulate filter in an exhaust system of the vehicle. The method determines whether the combustion engine is or is not combusting fuel, and under a condition where the combustion engine is not combusting fuel, the catalyst is electrically heated until it has reached a temperature suitable to cause ignition of the particulate matter. The electric motor is used to facilitate rotation of the combustion engine at a rotational speed suitable to draw air into and be exhausted out of the combustion engine into the exhaust system, across the catalyst, and into the particulate filter to facilitate ignition of the particulate in the filter.

11 Claims, 2 Drawing Sheets

HYBRID ELECTRIC VEHICLE PARTICULATE REGENERATION METHOD AND SYSTEM

FIELD OF THE INVENTION

The subject invention relates to hybrid electric vehicles (HEVs), and more particularly to a particulate regeneration method and system for HEVs or plug-in hybrid electric vehicles (PHEVs).

BACKGROUND

PHEVs can have significant periods of engine-off operation during charge depletion modes of operation, creating a situation where the engine may be cold-started multiple times that potentially increases the creation and emission of particulate matter (PM).

Accordingly, it is desirable to provide a method and system for collecting and regenerating PM to avoid an increase in PM emissions in HEVs and PHEVs.

SUMMARY OF THE INVENTION

In one exemplary embodiment of the invention a method is applied to regenerate particulate matter (PM) in a particulate filter (PF) of a hybrid electric vehicle (HEV) having a combination of a combustion engine and an electric motor for propelling the HEV, the HEV having an electrically heated catalyst (EHC) disposed in flow communication with the PF in an exhaust system of the HEV. The method determines whether the combustion engine is or is not combusting fuel, and under a condition where the combustion engine is not combusting fuel, the EHC is electrically heated until the EHC has reached a temperature suitable to cause ignition of the PM in the PF. The electric motor is used to facilitate rotation of the combustion engine at a rotational speed suitable to draw air into and be exhausted out of the combustion engine into the exhaust system, across the EHC, and into the PF to facilitate ignition of the PM in the PF.

In another exemplary embodiment of the invention a particulate regeneration system is configured for a hybrid electric vehicle (HEV), the HEV having a combination of a combustion engine and an electric motor for propelling the HEV. An electrically heated catalyst (EHC) is disposed in exhaust flow communication with an exhaust system of the combustion engine. A particulate filter (PF) is disposed in exhaust flow communication with and downstream of the EHC. A controller is operably disposed in signal communication with a control system of the combustion engine, a control system of the electric motor, a control system of the EHC, and a control system of the PF, the controller being responsive to computer executable instructions which when executed by the controller facilitate a method to regenerate particulate matter (PM) in a PF. The method includes determining whether the combustion engine is or is not combusting fuel, and under a condition where the combustion engine is not combusting fuel, electrically heating the EHC until the EHC has reached a temperature suitable to cause ignition of the PM in the PF, and using the electric motor to facilitate rotation of the combustion engine at a rotational speed suitable to draw air into and be exhausted out of the combustion engine into the exhaust system, across the EHC, and into the PF to facilitate ignition of the PM in the PF.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
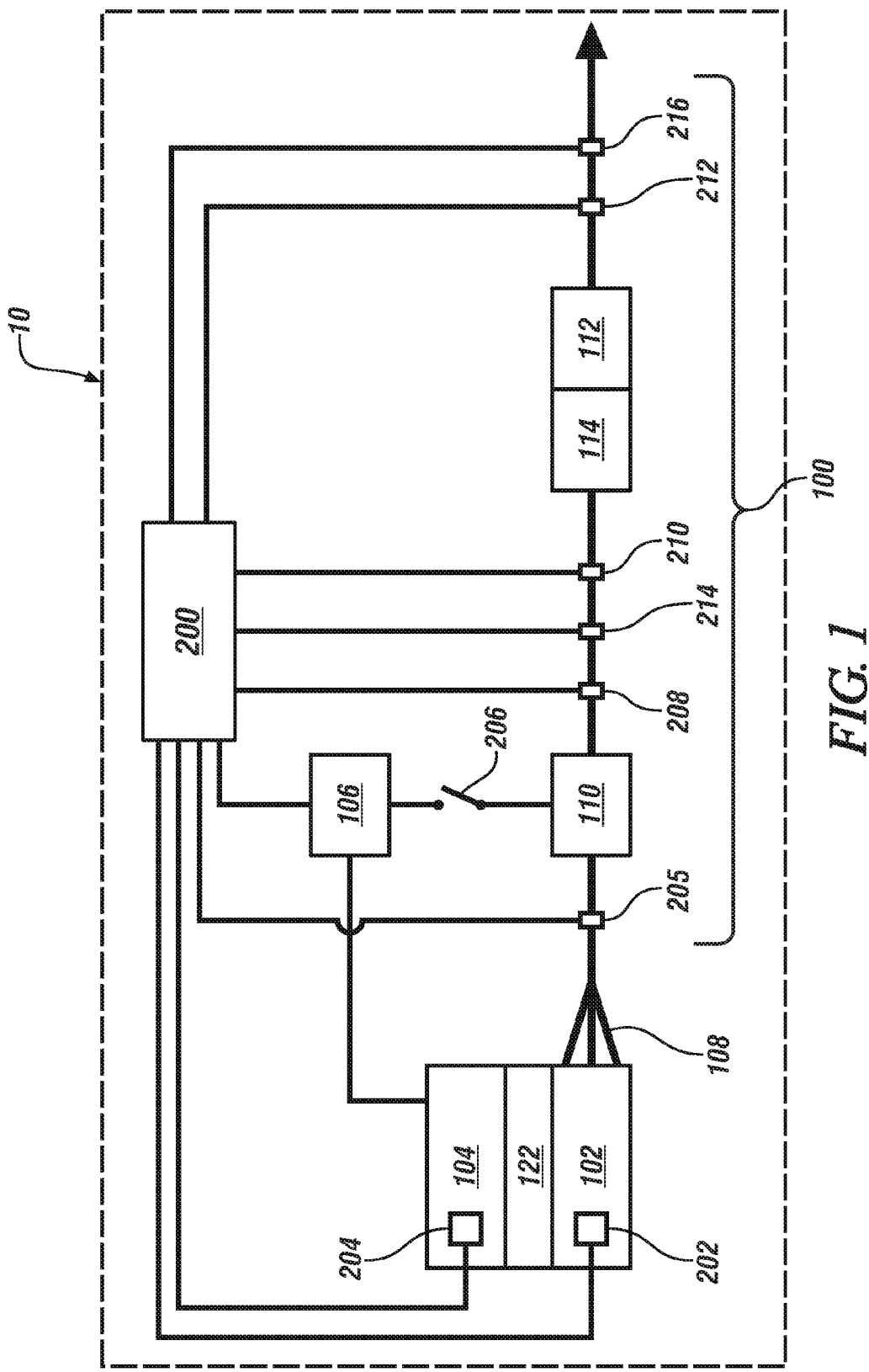
FIG. 1 depicts in one-line block diagram form an exemplary particulate regeneration system for use with a hybrid electric vehicle (HEV) or a plug-in hybrid electric vehicle (PHEV), in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention that is directed to an HEV, or a PHEV, having both an electric motor (EM) and an internal combustion engine (ICE), a control strategy and system as described herein leverages the operational characteristics of an electrically heated catalyst (EHC) and a particulate filter (PF) to initiate regeneration of the particulate matter (PM) collected in the PF, and the operational characteristics of an unfueled ICE to provide air flow to control the PM regeneration temperature, where the PM becomes the fuel that powers the PF regeneration process, and the unfueled air flow from the ICE becomes a control element in the PF regeneration process.

In accordance with an exemplary embodiment of the invention, and with reference to FIG. 1, a particulate regeneration system 100 is illustrated in one-line block diagram form for use with an HEV or a PHEV. As used herein and in accordance with an embodiment of the invention, reference to an HEV is intended to encompass both HEVs and PHEVs. That said, since HEVs typically do not have a long engine-off time as compared to PHEVs due to HEVs having a comparatively smaller battery, an embodiment of the invention disclosed herein may be more applicable to PHEVs than to HEVs. However, since a PHEV is a specialized form of an HEV (plug-in versus not plug-in), the foregoing reference to the term HEV intending to encompass both HEVs and PHEVs, remains. A typical HEV, only partially depicted by reference numeral 10, includes both an ICE 102, and an EM 104 powered by a battery set 106 suitably sized to provide sufficient DC power to operate the EM 104 over a desired distance, for example. In an embodiment, the battery set 106 provides DC voltage in the range of 250-400Vdc and DC power in the range of 8-80 KW-hrs (Kilowatt-hours).

An exhaust manifold 108 directs exhaust gases from the ICE 102 to the regeneration system 100, which in an embodiment includes an EHC 110, a PF 112, and a controller 200. An exemplary EHC suitable for a purpose disclosed herein is an extruded EHC available from NGK Insulators, Ltd., with positive and negative electrodes placed on opposing surfaces of the extruded form. An exemplary PF suitable for a purpose disclosed herein is described in U.S. Pat. No. 7,524,360. The EHC 110 is disposed in exhaust flow communication with the exhaust manifold 108, and the PF 112 is disposed in exhaust flow communication with and downstream of the EHC 110. In an embodiment, a three-way catalyst (TWC) 114 may be optionally disposed in exhaust flow communication with and upstream of the PF 112.

Figure 2:
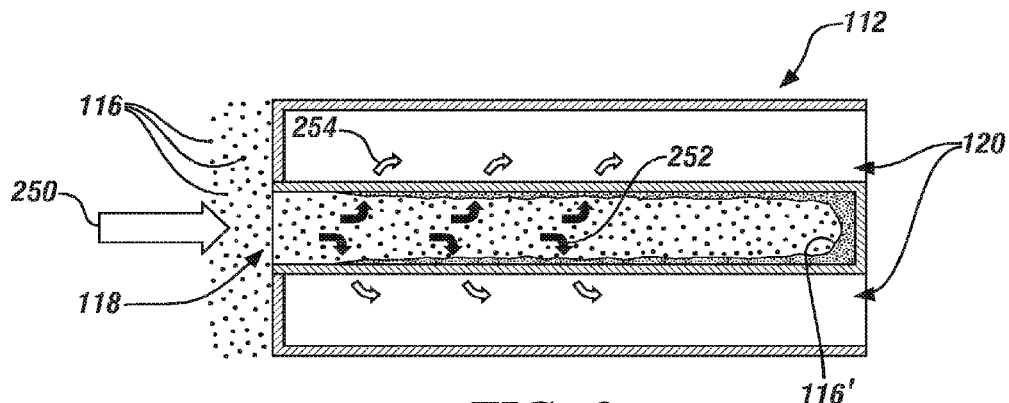
FIG. 2 depicts an exemplary particulate filter (PF) for use in accordance with an embodiment of the invention.

The controller 200 is operably disposed in signal communication with a control system 202 of the ICE 102, a control system 204 of the EM 104, a control system of the EHC 110, and a control system of the PF 112. In an embodiment, control system 202 is an electronic control module that monitors operational characteristics of the ICE 102, such as fuel consumption and engine RPM (revolutions per minute) for example, and provides regulatory control to the ICE 102, such as control of the fuel-air ratio used for combustion for example. In an embodiment, control system 204 is an electronic control module that monitors operational characteristics of the EM 104, such as power consumption and torque output for example, and provides regulatory control to the EM 104, such as control of the power delivery used for torque production for example. In an embodiment, control systems 202 and 204 may be integrally formed into a single electronic control module. In an embodiment, the control system of the EHC 110 includes an oxygen sensor (O1) 205 disposed in the exhaust flow upstream of the EHC 110, and a switch 206 disposed and configured to connect and disconnect power from the battery set 106 to the EHC 110. In an embodiment, the control system of the PF 112 includes an oxygen sensor (O2) 208 disposed in the exhaust flow downstream of the EHC 110 and upstream of the PF 112, an inlet temperature sensor (T1) 210 disposed in the exhaust flow downstream of the EHC 110 and upstream of the PF 112, an outlet temperature sensor (T2) 212 disposed in the exhaust flow downstream of the PF 112, and delta pressure sensors (P1, P2) 214, 216 across the inlet and outlet ports of the PF 112. With reference to FIGS. 1 and 2, temperature sensors (T1, T2) 210, 212 are closely coupled to the respective inlet and outlet ports 118, 120 of PF 112 so that a temperature of particulate matter (PM) 116, best seen with reference to FIG. 2, under ignition inside the PF 112 can be determined either directly or indirectly, such as by being inferred. In the embodiment depicted in FIG. 2, ignition of the PM 116 occurs first at the inlet port 118 and progresses toward the trapped PM 116' proximate the outlet port 120. Exhaust flow entering and passing through the PF 112 is generally depicted in FIG. 2 by reference numerals 250 (exhaust flow entering the PF 112), 252 (pre-filtered exhaust flow) and 254 (filtered exhaust flow).

Figure 3:
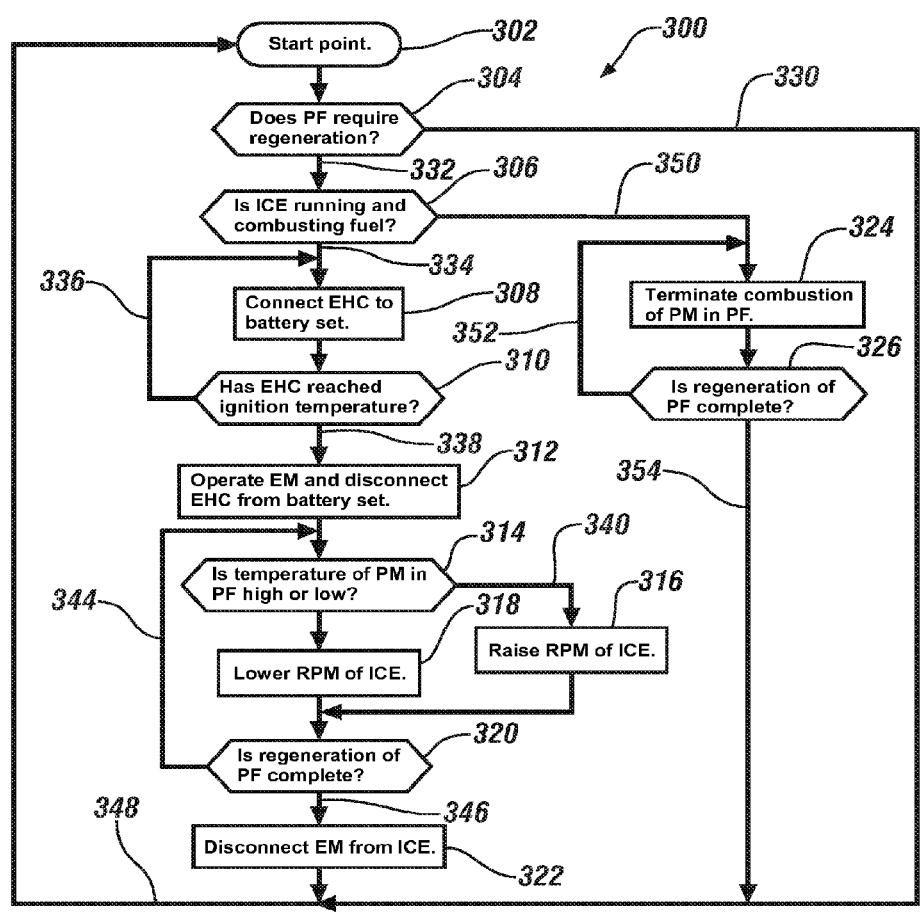
FIG. 3 depicts an exemplary method for regenerating a PF in an HEV or a PHEV, in accordance with an embodiment of the invention.

In an embodiment, controller 200 is responsive to computer executable instructions which when executed by the controller 200 facilitate a method to regenerate the PM 116 inside the PF 112, which will now be discussed with reference to FIG. 3 depicting an exemplary control flowchart (method) 300.

Block 302 of flowchart 300 is representative of a start point for a hybrid PM regeneration continuous loop, where an embodiment of the invention runs the illustrated process in a continuous loop to facilitate continuous regeneration of the PM 116 in the PF 112 of the HEV 10. In an embodiment, method 300 continuously cycles unless otherwise interrupted, such as when the HEV 10 is turned off and not in use for example.

At block 304 a determination is made as to whether the PF 112 requires regeneration, such as, for example, the filter is full (PF full), or not (PF not full). If it is determined that the PF 112 does not require regeneration, then method 300 continues on path 330 and cycles around to block 302 to continue with the monitoring of the state of the PF 112 until it does require regeneration or until the monitoring is otherwise interrupted.

Such monitoring to determine whether the PF 112 requires regeneration or not may be accomplished using several techniques. A first technique uses the delta pressure sensors (P1, P2) 214, 216 across the inlet and outlet ports of PF 112 to estimate PM loading, with a high pressure differential indicating a need for regeneration. A second technique uses a PM model to estimate PM loading. And a third technique uses mileage to estimate PM loading, with a mileage differential since the last regeneration being greater than a defined threshold indicating a need for regeneration. Any suitable technique or combination of techniques for determining a need for regeneration may be employed. The three techniques described may be employed together, where regeneration of PF 112 will be triggered depending on whichever technique crosses a defined calibration threshold.

If it is determined at block 304 that the PF 112 does require regeneration, then method 300 continues on path 332 to block 306, where a determination is made whether the ICE 102 is or is not running and combusting fuel. In an embodiment, control system 202 provides the necessary information regarding the state of operation of ICE 102. Under a condition where the ICE 102 is not combusting fuel, the control logic of method 300 passes to block 308 via path 334 where controller 200 causes switch 206 to turn on, i.e., close or activate, to electrically connect EHC 110 to battery set 106 to electrically heat EHC 110 until it has reached a temperature suitable to cause ignition of the PM 116 in PF 112. In an embodiment, the ignition temperature of the PM 116 is 700 deg-C. At block 310, controller 200 determines via information received from temperature sensor 210 whether EHC 110 has reached the ignition temperature or not. If not, then control logic of method 300 cycles back to block 308 via path 336. When the temperature of PM 116 has been raised sufficiently for ignition, the logic of method 300 passes to block 312 via path 338 where controller 200 communicates with control system 204 to operate the EM 104 to facilitate rotation of the ICE 102 at a rotational speed suitable to draw air into and be exhausted out of the ICE 102 into the exhaust manifold 108, across the EHC 110, and into the PF 112 to facilitate continued ignition of the PM 116 in the PF 112, and to turn off, i.e., open or inactivate, switch 206 to disconnect the EHC 110 from the battery set 106. The EM 104 may be utilized to draw air into the ICE 102 with or without the HEV 10 being electrically propelled. The combination of heat from the EHC 110 and oxygen from the air drawn by ICE 102, which when operating according to the above noted conditions acts as an air pump, ignites and maintains the ignition of the PM 116 in PF 112. In an embodiment, the EM 104 acts through a transmission (TR) 122, a clutched pulley and drive belt system (also referred to by reference numeral 122), or any other suitable means (also referred to by reference numeral 122) for mechanically coupling the EM 104 to the ICE 102, to facilitate operation of the ICE 102 at a controlled RPM. While the above described logic at block 312 indicates that electrical power to the EHC 110 is turned off concurrent with EM 104 facilitating rotation of the ICE 102, it will be appreciated that the EHC 110 may be turned off prior to or subsequent to the EM 104 being used to rotate the ICE 102, depending on whether the PM 116 in the PF 112 is in a state of ignition or not, which may be determined by controller 200 via any suitable information from temperature sensor 210 for making this determination.

Under conditions where the PM 116 in the PF 112 is under ignition and the EHC 110 is off, control logic passes to block 314 where controller 200 monitors a temperature indicative of the PM 116 in the PF 112, which in an embodiment is derived from information received from temperature sensor 210. To maintain ignition of and regeneration of the PM 116 in PF 112, controller 200 uses the EM 104 to raise, at block 316, or lower, at block 318, the RPM of the ICE 102 depending on whether the temperature of the PM 116 is indicated to be higher or lower, respectively, than a defined threshold value, such as 700 deg-C. That is, if the temperature of the PM 116 is higher than the threshold value, then control logic passes to block 316 via path 340 to increase the RPM of the ICE 102, and if the temperature of the PM 116 is lower than the threshold value, then control logic passes to block 318 via path 342 to decrease the RPM of the ICE 102.

At block 320 controller 200 determines whether regeneration of the PF 112 is complete or not, which may be determined from any information suitable for making this determination, including information received from temperature sensors 210, 212, delta pressure sensors 214, 216, or a combination thereof. For example, in an embodiment, complete regeneration may be inferred if the temperature profile between temperature sensor T1 210 and temperature sensor T2 212 has displayed over the course of regeneration a temperature rise at T1 210, followed by a temperature rise at T2 212, followed by a temperature fall at both T1 210 and T2 212. In another embodiment, complete regeneration may be inferred if the pressure profile between pressure sensor P1 214 and pressure sensor P2 216 has displayed over the course of regeneration a high pressure differential between P1 214 and P2 216 followed by low pressure differential therebetween. If regeneration of the PF 112 is not complete, then the logic of method 300 cycles back to block 314 via path 344. If regeneration of the PF 112 is complete, then the logic of method 300 continues to block 322 via path 346 where controller 200 signals the control system 204 of EM 104 to disconnect the EM 104 from the ICE 102 to stop rotation of the ICE 102 to prevent any further air from being drawn into and exhausted out of the ICE 102 and through the PF 112. From block 322, the logic of method 300 cycles back to block 302 via path 348 where the regeneration method 300 continuously cycles unless otherwise interrupted.

Referring back to block 306, under a condition where the PF 112 was previously determined to require regeneration and the ICE 102 is running and combusting fuel, such as when an operator of the HEV 10 depresses an accelerator pedal of the HEV 10 resulting in a demand for speed and/or power that is beyond the capability of the EM 104 alone, the logic of method 300 passes to block 324 via path 350 where controller 200 signals the control unit 202 of the ICE 102 to provide an air-fuel ratio to the ICE 102 that is sufficient to terminate combustion, such as a ratio that is about equal to the stoichiometric ratio associated with the ICE 102 such that all of the oxygen used by the ICE 102 for combustion of the fuel is consumed, which serves to smother and extinguish combustion of the PM 116 in the PF 112 to prevent a thermal runaway condition within the PF 112.

At block 326 the controller 200 monitors a temperature indicative of the temperature of the PM 116 in the PF 112, such as using temperature sensor T1 201 for example, to determine whether regeneration of PF 112 is complete or not. If regeneration is determined to be not complete, temperature sensor T1 201 will register that a hot condition remains, that is, the temperature from sensor T1 201 will register a value higher than a defined threshold value, such as 700 deg-C for example, indicating that the combusting PM 116 has not yet been smothered and extinguished, resulting in the control logic of method 300 cycling back to block 324 via path 353 to maintain a condition that will extinguish combustion, such as the air-fuel ratio being maintained at about the stoichiometric ratio. If regeneration of PF 112 is determined at block 326 to be complete, temperature sensor T1 201 will register that a cold condition exists, that is, the temperature from sensor T1 201 will register a value lower than the defined threshold value, indicating that the combusting PM 116 has been smothered and extinguished, then the control logic of method 300 cycles back to block 302 via path 354 where the regeneration method 300 continuously cycles unless otherwise interrupted.

In an embodiment, the continuous regeneration loop of method 300 is implemented by controller 200 while the HEV 10 is being propelled by the EM 104 with no exhaust flow from the ICE 102.

In view of the foregoing, it will be appreciated that an embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), erasable programmable read only memory (EPROM), electrically erasable programmable read only memory (EEPROM), or flash memory, for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or wirelessly via electromagnetic radiation, wherein when the computer program code is loaded into and executed by a computer, the computer becomes an apparatus for practicing the invention. When implemented on a general-purpose microprocessor-based controller, such as controller 200 for example, the computer program code segments configure the microprocessor to create specific logic circuits. A technical effect of the executable instructions is to regenerate PM in a PF to avoid an increase in PM emissions in HEVs and PHEVs in accordance with an embodiment of the invention described herein.

In view of the foregoing description and illustration, it will be appreciated that a method and system has been herein described having at least one of the following advantages: reduction of PM emissions resulting from multiple cold engine starts in an HEV; utilization of air flow from an unfueled ICE to facilitate control of PM regeneration in a PF; utilization of an EHC to provide sufficient catalyst temperature to initiate PM regeneration with no exhaust flow from the ICE, including periods while the HEV is propelled electrically; utilization of air flow from a rotating ICE absent fuel combustion to transfer thermal energy from the EHC to start combustion of PM on the upstream end of the PF; leverage of the inherent energy in PM for regeneration of the PF while closely controlling the combustion temperature using air flow from an unfueled ICE; a quick and fuel efficient PF regeneration process; and, controlled operation of a fueled ICE to smother and extinguish PM combustion, such as controlled utilization of the stoichiometric operation for example, to prevent uncontrolled PM regeneration temperatures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method to regenerate particulate matter (PM) in a particulate filter (PF) of a hybrid electric vehicle (HEV) having a combination of a combustion engine and an electric motor for propelling the HEV, the HEV having an electrically heated catalyst (EHC) disposed in flow communication with the PF in an exhaust system of the HEV, the method comprising:

monitoring a state of the particulate filter to determine if the particulate filter requires regeneration or not;

if the particulate filter is determined to not require regeneration, then continuing with the monitoring of the state of the particulate filter until it does require regeneration or until the monitoring is otherwise interrupted;

if the particulate filter is determined to require regeneration, then determining whether the combustion engine is or is not combusting fuel;

under a condition where the combustion engine is not combusting fuel, electrically heating the EHC until the EHC has reached a temperature suitable to cause ignition of the PM in the PF, and using the electric motor to facilitate rotation of the combustion engine at a rotational speed suitable to draw air into and be exhausted out of the combustion engine into the exhaust system, across the EHC, and into the PF to facilitate ignition of the PM in the PF;

under a condition where the combustion engine is combusting fuel, setting the air-fuel ratio of the combustion engine to be about equal to a stoichiometric ratio associated with the combustion engine such that all of the oxygen used by the combustion engine for combustion of the fuel is consumed.

2. The method of claim 1, further comprising:

under the condition where the combustion engine is not combusting fuel and the PM in the PF is under ignition, monitoring a temperature indicative of a temperature of the PM in the PF, and using the electric motor to raise or lower the rotational speed of the combustion engine if the temperature of the PM is indicated to be higher or lower, respectively, than a threshold value.

3. The method of claim 2, further comprising:

determining if regeneration of the PF is complete, and if yes, then stopping rotation of the combustion engine to stop further air flow through the exhaust system;

if regeneration of the PF is determined to be not complete, then continuing with the monitoring of the PM temperature, and the raising and lowering of the rotational speed of the combustion engine in response to whether the temperature of the PM is indicated to be higher or lower, respectively, than the threshold value.

4. The method of claim 1, further comprising:

under the condition where the combustion engine is not combusting fuel, turning the EHC off subsequent to the EHC having reached a temperature suitable to facilitate ignition of the PM in the PF.

5. The method of claim 1, wherein:

under the condition where the combustion engine is not combusting fuel, the HEV is being propelled by the electric motor with no exhaust flow from the combustion engine.

6. The method of claim 1, further comprising:

under the condition where the combustion engine is combusting fuel, monitoring a temperature indicative of a temperature of the PM in the PF;

if the temperature of the PM is indicated to be higher than a threshold value, then continuing to set the air-fuel ratio equal to the stoichiometric ratio;

if the temperature of the PM is indicated to be lower than a threshold value, then discontinuing to set the air-fuel ratio equal to the stoichiometric ratio.

7. A particulate regeneration system for a hybrid electric vehicle (HEV), the HEV having a combination of a combustion engine and an electric motor for propelling the HEV, the system comprising:

an electrically heated catalyst (EHC) disposed in exhaust flow communication with an exhaust system of the combustion engine;

a particulate filter (PF) disposed in exhaust flow communication with and downstream of the EHC;

a controller operably disposed in signal communication with a control system of the combustion engine, a control system of the electric motor, a control system of the EHC, and a control system of the PF, the controller being responsive to computer executable instructions which when executed by the controller facilitate a method to regenerate particulate matter (PM) in the PF, the method comprising:

monitoring a state of the particulate filter to determine if the particulate filter requires regeneration or not;

if the particulate filter is determined to not require regeneration, then continuing with the monitoring of the state of the particulate filter until it does require regeneration or until the monitoring is otherwise interrupted;

if the particulate filter is determined to require regeneration, then determining whether the combustion engine is or is not combusting fuel;

under a condition where the combustion engine is not combusting fuel, electrically heating the EHC until the EHC has reached a temperature suitable to cause ignition of the PM in the PF, and using the electric motor to facilitate rotation of the combustion engine at a rotational speed suitable to draw air into and be exhausted out of the combustion engine into the exhaust system, across the EHC, and into the PF to facilitate ignition of the PM in the PF;

under a condition where the combustion engine is combusting fuel, setting the air-fuel ratio of the combustion engine to be about equal to a stoichiometric ratio associated with the combustion engine such that all of the oxygen used by the combustion engine for combustion of the fuel is consumed.

8. The particulate regeneration system of claim 7, wherein the method facilitated by the controller further comprises:

under the condition where the combustion engine is not combusting fuel and the PM in the PF is under ignition, monitoring a temperature indicative of a temperature of the PM in the PF, and using the electric motor to raise or lower the rotational speed of the combustion engine if the temperature of the PM is indicated to be higher or lower, respectively, than a threshold value.

9. The particulate regeneration system of claim 8, wherein the method facilitated by the controller further comprises:

determining if regeneration of the PF is complete, and if yes, then stopping rotation of the combustion engine to stop further air flow through the exhaust system.

10. The particulate regeneration system of claim 9, wherein the method facilitated by the controller further comprises:

if regeneration of the PF is determined to be not complete, then continuing with the monitoring of the PM temperature, and the raising and lowering of the rotational speed of the combustion engine in response to whether the temperature of the PM is indicated to be higher or lower, respectively, than the threshold value.

11. The particulate regeneration system of claim 7, wherein the method facilitated by the controller further comprises:
   under the condition where the combustion engine is combusting fuel, monitoring a temperature indicative of a temperature of the PM in the PF;
   if the temperature of the PM is indicated to be higher than a threshold value, then continuing to set the air-fuel ratio equal to the stoichiometric ratio; and
   if the temperature of the PM is indicated to be lower than a threshold value, then discontinuing to set the air-fuel ratio equal to the stoichiometric ratio.

* * * * *